United States Patent
Lindsay

(10) Patent No.: US 11,893,136 B2
(45) Date of Patent: Feb. 6, 2024

(54) TOKEN-BASED DATA SECURITY SYSTEMS AND METHODS WITH CROSS-REFERENCING TOKENS IN FREEFORM TEXT WITHIN STRUCTURED DOCUMENT

(71) Applicant: OPEN TEXT HOLDINGS, INC., San Mateo, CA (US)

(72) Inventor: Walter Hughes Lindsay, Phoenix, AZ (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 26 days.

(21) Appl. No.: 17/460,092

(22) Filed: Aug. 27, 2021

(65) Prior Publication Data
US 2022/0067207 A1 Mar. 3, 2022

Related U.S. Application Data

(60) Provisional application No. 63/071,618, filed on Aug. 28, 2020.

(51) Int. Cl.
*G06F 21/62* (2013.01)
*G06F 40/284* (2020.01)
(Continued)

(52) U.S. Cl.
CPC .......... *G06F 21/6254* (2013.01); *G06F 16/93* (2019.01); *G06F 21/6218* (2013.01);
(Continued)

(58) Field of Classification Search
CPC .... G06F 21/6254; G06F 6/93; G06F 21/6218; G06F 21/6227; G06F 40/103;
(Continued)

(56) References Cited

U.S. PATENT DOCUMENTS 8,458,487 B1 * 6/2013 Palgon ............... G06F 21/00
713/193
8,806,204 B2 8/2014 Chambers et al.
(Continued)

OTHER PUBLICATIONS

"OneTrust Acquires Redacted.ai for Data Redaction," Mar. 1, 2021, downloaded from <<https://www.onetrust.com/blog/onetrust-acquires-redacted-ai/>> on Aug. 27, 2021, 3 pages.
(Continued)

*Primary Examiner* — Dong G Zhao
*Assistant Examiner* — Andrew Suh
(74) *Attorney, Agent, or Firm* — SPRINKLE IP LAW GROUP

(57) ABSTRACT

Multiple types of tokens can be generated and utilized in a highly structured document with freeform text. For example, a tokenization system may receive a request for tokenizing a document with a first portion having structured content and a second portion having unstructured or semi-structured content. In response, the tokenization system identifies sensitive information in the first portion of the document, generates format-preserving tokens for the sensitive information in the first portion of the document, identifies sensitive information in the second portion of the document, and generates self-describing tokens for the sensitive information in the second portion of the document. The self-describing tokens reference the sensitive information in the first portion of the document. The tokenization system may then communicate the format-preserving tokens and the self-describing tokens to the first client computing system or to a second client computing system.

20 Claims, 6 Drawing Sheets

(51) Int. Cl.
*G06F 16/93* (2019.01)
*G06F 40/103* (2020.01)
*G06F 40/166* (2020.01)

(52) U.S. Cl.
CPC ........ *G06F 21/6227* (2013.01); *G06F 40/103* (2020.01); *G06F 40/166* (2020.01); *G06F 40/284* (2020.01); *G06F 2221/2141* (2013.01)

(58) Field of Classification Search
CPC ............ G06F 40/166; G06F 40/284; G06F 2221/2141; G06F 21/6209; G06F 16/93
See application file for complete search history.

(56) References Cited

U.S. PATENT DOCUMENTS

| | | | | |
|---|---|---|---|---|
| 8,949,371 | B1* | 2/2015 | Shrowty | G06F 21/6218 709/217 |
| 2012/0321078 | A1 | 12/2012 | Chambers et al. | |
| 2012/0324223 | A1 | 12/2012 | Chambers et al. | |
| 2017/0272472 | A1 | 9/2017 | Adhar | |
| 2018/0285591 | A1* | 10/2018 | Thayer | G06F 21/6254 |
| 2019/0057222 | A1* | 2/2019 | Bradley | G06F 21/602 |
| 2020/0272762 | A1* | 8/2020 | Dawkins | G06F 21/6254 |
| 2022/0067184 | A1 | 3/2022 | Lindsay | |
| 2022/0067205 | A1 | 3/2022 | Lindsay | |
| 2022/0067206 | A1 | 3/2022 | Lindsay | |
| 2022/0075796 | A1 | 3/2022 | Lindsay | |

OTHER PUBLICATIONS

2. Z.C Nxumalo et al., "Towards Privacy with Tokenization as a Service," V. 2015, IEEE International Conference on Adaptive Science and Technology, ICAST, downloaded from <<https://www.researchgate.net/publication/283108177_Towards_privacy_with_tokenization_as_a_service>> on Aug. 27, 2021, 7 pages.
"Voltage Secure Stateless Tokenization Advances Data Security for Enterprises, Merchants and Payment Processors," Voltage Security, Press Releases, Dec. 18, 2012, downloaded from <<https://www.coalfire.com/medialib/assets/Press_Releases/Voltage_SST_Press_Release_FINAL.pdf?ext=.pdf>> on Aug. 27, 2021, 2 pages.
"Software Testing Validation and Verification," Arbour Group, downloaded from <<https://www.arbourgroup.com/services/validation-compliance/software-testing-validation-and-verification/?utm_source=google&utm_medium=cpc&utm_campaign=&utm_term=software%20validation&gclid=EAIaIQobChMI1anwx5_K8AIVLMmUCR1jqwhZEAAYASAAEgLh_PD_BwE>> on Aug. 27, 2021, 4 pages.
N. Lomas, "Researchers Spotlight the Lie of 'Anonymous' Data," Jul. 24, 2019, downloaded from <<https://techcrunch.com/2019/07/24/researchers-spotlight-the-lie-of-anonymous-data/>> on Aug. 27, 2021, 9 pages.
"Effective Personal-Identity and Metadata Redaction Techniques for Subsequent E-Filing," downloaded from <<https://www.azd.uscourts.gov/sites/default/files/documents/redaction.pdf>> on Aug. 27, 2021, 1 page.
"OpenText Brava! Securely View, Annotate and Redact Virtually Any Type of File," Open Text, downloaded from <<https://www.opentext.com/products-and-solutions/products/enterprise-content-management/opentext-brava>> on Aug. 27, 2021, 12 pages.
8. B. Sondhi, "Comforte SecurDPS: Enterprise Solution for GDPR," White Paper, Published by Coalfire Systems, Inc., Jun. 2020, 21 pages.
International Preliminary Report on Patentability (IPRP), issued by the International Bureau for International PCT Application No. PCT/US2021/048085, dated Mar. 9, 2023, 13 pages.
Office Action issued by the U.S. Patent and Trademark Office for U.S. Appl. No. 17/460,040, dated Apr. 28, 2023, 14 pages.
International Search Report and Written Opinion issued for International PCT Application No. PCT/US21/48085 < dated Dec. 1, 2021, 14 pages.
Nubridges, Tokenizing Sensitive Data [retrieved from <<https://web.archive.org/web/20090928203420/http://www.nubridges.com/solutions/tokenization/>> Sep. 28, 2009, 2 pages.
Notice of Allowance issued by the U.S. Patent and Trademark Office (USPTO) for U.S. Appl. No. 17/460,040, dated Nov. 15, 2023, 13 pages.
Corrected Notice of Allowability issued by the U.S. Patent and Trademark Office (USPTO) for U.S. Appl. No. 17/460,040, dated Dec. 11, 2023, 4 pages.

* cited by examiner

TOKEN-BASED DATA SECURITY SYSTEMS AND METHODS WITH CROSS-REFERENCING TOKENS IN FREEFORM TEXT WITHIN STRUCTURED DOCUMENT

CROSS-REFERENCE TO RELATED APPLICATIONS

This application is a conversion of, and claims a benefit of priority under 35 U.S.C. § 119(e) from, U.S. Provisional Application No. 63/071,618, filed Aug. 28, 2020, entitled "TOKEN-BASED DATA SECURITY SYSTEMS AND METHODS," which is hereby fully incorporated by reference herein. This application relates to a co-pending U.S. patent application Ser. No. 17/460,007, filed Aug. 10, 2021, entitled "TOKEN-BASED DATA SECURITY SYSTEMS AND METHODS FOR STRUCTURED DATA," a co-pending U.S. patent application Ser. No. 17/460,040, filed Aug. 10, 2021, entitled "TOKEN-BASED DATA SECURITY SYSTEMS AND METHODS WITH EMBEDDABLE MARKERS IN UNSTRUCTURED DATA," and a co-pending U.S. patent application Ser. No. 17/460,094, filed Aug. 10, 2021, entitled "TOKENIZATION SYSTEMS AND METHODS FOR REDACTION." All applications listed in this paragraph are hereby incorporated by reference herein.

TECHNICAL FIELD

This disclosure relates generally to data security in data processing. More particularly, this disclosure relates to data tokenization for protecting sensitive data. Even more particularly, this disclosure relates to data security systems, methods, and computer program products for creating and utilizing various types of tokens, including format-preserving, self-describing, and patterned tokens, to protect sensitive data in content, including structured content and unstructured content.

BACKGROUND OF THE RELATED ART

In data security, the term "token" refers to a non-sensitive data element that can be used as a surrogate in place of a sensitive data element. In general, a token has no extrinsic or exploitable meaning or value, other than serving as a reference to the sensitive data element when processed through a tokenization system.

Generally, a tokenization system is a computing system that is responsible for creating a token, using methods such as a random number generation method that cannot be reverse-engineered, and for detokenizing the token back to the sensitive data element.

A data processing application communicatively connected to the tokenization system may, in processing a data file, a document, or a data record, request the tokenization system to generate tokens and replace sensitive data values in the data file, the document, or the data record with the tokens before producing a processed output. This approach has generally been used in the Payment Card Industry (PCI) and electronic medical records (EMRs) applications.

As an example, sensitive data can be sent, via an application programming interface (API) call or batch file, from a data processing application to a tokenization provider's system. The tokenization provider's system then generates tokens, stores the original data in a secure token vault, and returns desensitized data in which the original sensitive data is replaced with an unrelated value of the same length and format. The tokens can retain elements of the original data. However, unlike encrypted data, tokenized data is undecipherable and irreversible. Because there is no mathematical relationship between a token and the original data for which it replaces, the token cannot be transformed back to its original form.

SUMMARY OF THE DISCLOSURE

Since a token traditionally has no extrinsic or exploitable meaning or value, its use across various types of data security applications is generally limited. Embodiments disclosed herein are directed to new types of data security tokens that can be used in various data security systems, methods, and computer program products. The tokens can be created and utilized for protecting sensitive data in structured content as well as unstructured content. This disclosure describes example embodiments of data security through data tokenization from the following aspects.

According to a first aspect, format-preserving tokens can be generated and utilized in tokenizing sensitive data values in structured data and the sensitive data values can be manipulated and later revealed in an anonymizing mapping revealing ("AMR") process. In some embodiments, a method for securing data can include receiving, by a tokenization system from a first client computing system, a request for data anonymization, the request referencing structured data containing values of interest. The tokenization system can perform a tokenization operation on the structured data which can include generating, for a value of interest in the structured data, a corresponding token and replacing the value of interest in the structured data with the corresponding token, thereby producing an anonymized version of the structured data. The tokenization system can store the value of interest with the corresponding token in a secure data vault, for instance, as a token-value pair. In some embodiments, the corresponding token is one of a plurality of format-preserving tokens generated for the values of interest. The tokenization system can then communicate the anonymized version of the structured data to the first client computing system.

Subsequently, the tokenization system may receive, from the first client computing system or a second client computing system, a request for revealing the anonymized version of the structured data containing the corresponding token. In response, the tokenization system can perform a reveal operation on the anonymized version of the structured data, the reveal operation including querying the secure data vault for the corresponding token and retrieving the value of interest from the secure data vault using the corresponding token. The reveal operation produces a detokenized version of the structured data containing the value of interest. The tokenization system can then communicate the detokenized version of the structured data to the first client computing system or to the second client computing system.

In some embodiments, the structured data comprises a single field of data, a form, a table, a database record, a document having multiple data fields, a credit card number, a social security number, a single element in an extensible markup language file, or a single column in a comma separated values file.

In some embodiments, the corresponding token has a head portion, a body portion, and a tail portion, wherein the head portion of the corresponding token preserves a format and a length of a corresponding head portion the value of interest, wherein the tail portion of the corresponding token preserves a format and a length of a corresponding tail portion the value of interest, and wherein the body portion of the corresponding token preserves a format and a length of a corresponding body portion the value of interest.

In some embodiments, the corresponding token has a head portion, a body portion, and a tail portion, wherein the head portion of the corresponding token preserves a format and a length of a corresponding head portion the value of interest, wherein the tail portion of the corresponding token preserves a format and a length of a corresponding tail portion the value of interest, and wherein the body portion of the corresponding token does not preserve a format or a length of a corresponding body portion the value of interest.

According to a second aspect, self-describing tokens with embeddable markers can be generated and utilized in freeform, unstructured data. In some embodiments, a method for securing data can include receiving, by a tokenization system from a first client computing system, a request for data anonymization, the request referencing unstructured or semi-structured content that contains values of interest for the data anonymization. The tokenization system may perform a tokenization operation on the unstructured or semi-structured content. The tokenization operation can include generating a self-describing token for replacing a value of interest in the unstructured or semi-structured content.

In some embodiments, a self-describing token has a preconfigured pattern, an indication of a protection strategy, and a token value. In some embodiments, the protection strategy specifies a technique for generating or formatting a surrogate for the value of interest in the unstructured or semi-structured content and for mapping between the surrogate and the value of interest in the unstructured or semi-structured content.

In some embodiments, the tokenization operation produces an anonymized version of the unstructured or semi-structured content with self-describing tokens, each anonymizing and corresponding to one or more of the values of interest in the unstructured or semi-structured content. The tokenization system can store the values of interest in a secure data vault and communicates the anonymized version of the unstructured or semi-structured content to the first client computing system.

Subsequently, the tokenization system may receive, from the first client computing system or a second client computing system, a request for revealing the anonymized version of the unstructured or semi-structured content. In response, the tokenization system can perform a reveal operation on the anonymized version of the unstructured or semi-structured content. The reveal operation can include searching the anonymized version of the unstructured or semi-structured content for the preconfigured pattern, identifying the self-describing tokens in the anonymized version of the unstructured or semi-structured content using the preconfigured pattern, and retrieving the values of interest from the secure data vault using the protection strategy and the self-describing tokens. The reveal operation produces a detokenized version of the unstructured or semi-structured content containing the values of interest. The tokenization system may then communicate the detokenized version of the unstructured or semi-structured content to the first client computing system or to the second client computing system.

In some embodiments, the tokenization system may mark a self-describing token in the unstructured or semi-structured content with a visual marker, for instance, at a start or an end of the self-describing token. In some embodiments, the tokenization system may mark a self-describing token in the unstructured or semi-structured content with a first visual marker at a start of the self-describing token and a second visual marker at an end of the self-describing token.

In some embodiments, the tokenization system is further configured for examining the unstructured or semi-structured content, retrieving the values of interest from the secure data vault using the self-describing tokens, performing a data manipulation operation on the values of interest, the data manipulation operation producing a transformed data value and creating a new token using a separate protection strategy for the transformed data value. As a non-limiting example, the data manipulation operation can include a substring operation.

According to a third aspect, multiple types of tokens can be generated and utilized in a highly structured document with freeform text. For instance, a doctor's note may be a structured document with structured data fields for a patient's first and last names and with a block of text that mentions the patient's first and last names which can be considered as sensitive information. A data processing application that is responsible for processing the doctor's note can employ a service, a function, or a plug-in that preprocesses and categorizes sensitive information in the structured fields as well as in the freeform text. In such cases, format-preserving tokens may be returned as surrogates for the sensitive information in the structured data fields and self-describing tokens may be returned as surrogates that cross-reference the patient's first and last names in the freeform text.

In some embodiments, a method for securing data can include receiving, from a first client computing system, a request for tokenizing a document with a first portion having structured content and a second portion having unstructured or semi-structured content. As a non-limiting example, the first portion of the document may have a data structure (e.g., a form, a database, a table, etc.) having data fields and the second portion of the document may have freeform text in one of the data fields.

In response, the tokenization system identifies sensitive information in the first portion of the document, generates format-preserving tokens for the sensitive information in the first portion of the document, identifies sensitive information in the second portion of the document, and generates patterned, self-describing tokens for the sensitive information in the second portion of the document. The self-describing tokens reference the sensitive information in the first portion of the document.

In some embodiments, a format-preserving token has a one-to-one connection to the sensitive information in the structured content and a self-describing token contains a protection strategy that specifies a technique for generating or formatting a surrogate for an actual value and for mapping between the surrogate and the actual value. The surrogate has a preconfigured pattern and a token value. In some embodiments, the tokenization system may mark a self-describing token in the second portion of the document with at least one visual marker in a human-readable form, for instance, at a start of the self-describing token and/or at an end of the self-describing token. The tokenization system may communicate the format-preserving tokens and the self-describing tokens to the first client computing system or to a second client computing system for use by, for instance, an automated recognition service, a redaction plug-in of a frontend application, etc.

According to a fourth aspect, patterned tokens with embedded signals or patterns can be generated and utilized for redaction through, for instance, an automated recognition service, a plug-in to a frontend user tool, etc. In some embodiments, a tokenization system may receive a request for redaction of sensitive textual content in a document. In responsive, the tokenization system may identify a portion of the document as the sensitive textual content and edits the document, for instance, by replacing the sensitive textual content thus identified with special, smart tokens. In this case, each token has a token value and a pattern that identifies a start and an end of the token value. As a non-limiting example, the pattern can include brackets at the start and the end of the token value. The editing produces a transformed version of the document with the tokens and without the sensitive textual content. The tokenization system stores the sensitive textual content in a secure data vault.

In some embodiments, these smart tokens are referred to as self-describing tokens. A self-describing token can have a protection strategy that specifies a technique for generating or formatting a surrogate for an actual value and for mapping between the surrogate and the actual value.

In some embodiments, the tokenization system may mark the tokens with human-readable visual markers that can be presented through a user interface so that changes made by the tokenization system to the document would be visible to a user through the user interface.

In some embodiments, the tokenization system may communicate the transformed version of the document with the tokens and without the sensitive textual content to the client computing system, an automated recognition service, or a redaction plug-in to a frontend application.

Some embodiments disclosed herein can be particularly useful for enterprise data management—from data governance to data quality, data security, and more. Some embodiments disclosed herein can be particularly useful for addressing compliance with government regulations and industry standards, including, but are not limited to, PCI Data Security Standard (PCI DSS), Health Information Privacy and Portability Act (HIPPA), General Data Protection Regulation (GDPR), and so on.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
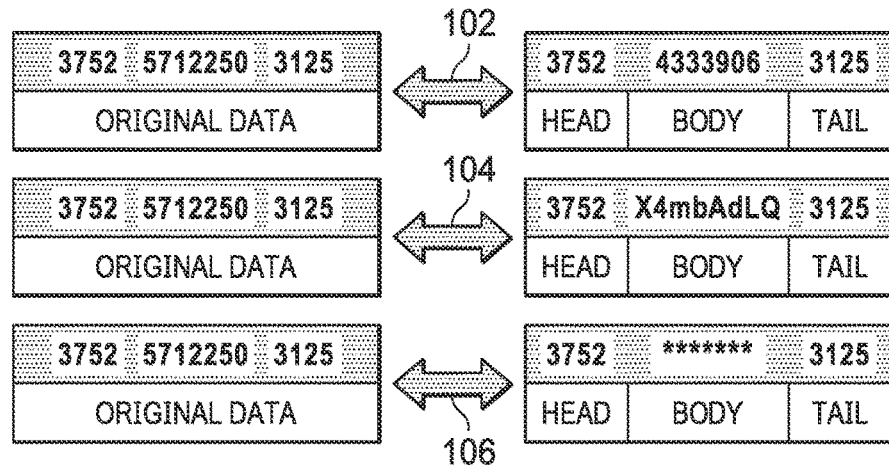
FIG. 1 illustrates examples of different tokenization operations that can transform original data into tokens of various types, including format-preserving tokens.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Data processing systems receive and produce data that contains sensitive data. Working with sensitive data has many challenges. For instance, many data protection standards require sensitive values not to be included in test data. However, in an enterprise computing environment, sensitive values can be found in integration workflows, databases, analytics systems, data warehouses, etc. The risk of leaking or misusing this kind of sensitive data can make enterprise data management extremely complex, difficult, and at risk of violating compliance regulations. This disclosure provides new types of data security tokens that can address these issues.

To protect individual sensitive data values, such as a credit card number, the industry has evolved a "tokenization" strategy, which entails providing a surrogate value, called a "token," to be used in place of the actual value. That is, in data security, tokens are surrogate values which are substitutes for the actual data (e.g., credit card number, social security number, account number, etc.), while the actual data is encrypted and stored elsewhere (e.g., in a secure data vault).

A tokenization operation takes as input a sensitive data value such as a credit card number, creates a randomized token, connects or associates the token with the original value, and returns the token, so that the application and any downstream processing can use the token in place of the original sensitive value without risking security breaches. The token-value pair is stored in a secure data vault, which is protected using strong encryption. The token can be used in all other systems outside the tokenization system that generated it. This minimizes the footprint of sensitive data in the computing environment (e.g., an enterprise computer network) where processing of the data takes place. As will be discussed below further, the original value can be restored if and when needed.

Tokens are secure because they have no mathematical connection to the original data values. This is in contrast to encryption where a mathematical connection is always maintained and can, in theory, be broken with enough computing power. The same weakness applies to a technology called vaultless tokenization. Vaultless tokenization refers to a type of tokenization where tokens are generated via an algorithm, instead of at random. This approach has some benefits in terms of performance, since it does not leverage a separate data vault to return the sensitive values. However, it has the same vulnerabilities as encryption.

In addition to being non-sensitive, tokens can be made to resemble the original data. This means that they can be safely used in enterprise applications without requiring system changes. Some applications, such as a human resources (HR) application, have as their primary purpose to manage sensitive data values in an enterprise computing environment. For such applications, tokenization can be very useful at the integration layer as data is brought to these applications or as data comes out of these applications to other applications or databases in the enterprise computing environment, allowing tokens to be used everywhere else, thus protecting the broader use of the data.

For instance, with an appropriate tokenization system, a token can be used to "reveal" the original value on demand (e.g., by using the token to look up and retrieve the real value). To distinguish from other uses of tokens (e.g., token-based secure communications, authentication, access control, etc.), this tokenization strategy is referred to herein as "vault-based tokenization." In vault-based tokenization, sensitive data values in data files or data records are replaced with surrogate values or "tokens" that can be used in place of the original, real values and the original values are encrypted and stored (e.g., with the tokens as token-value pairs) in a secure data vault.

Unlike other types of data security measures such as encryption and vaultless tokenization, tokens used in vault-based tokenization are not mathematically derived from the original data. This means that the original data values likewise cannot be mathematically derived from tokens. Since tokens are not considered sensitive data, they can be safely passed to databases, applications, mobile devices, and so on, in place of the original sensitive data. The format of tokens can resemble that of the original data. This format-preserving feature allows tokens to be processed in similar ways (e.g., passing the Luhn check for credit card numbers).

FIG. 1 illustrates by example some possible tokenization operations 102, 104, 106. In the example of FIG. 1, tokens produced via tokenization operations can be structured as having a head portion, a body portion, and a tail portion.

In particular, tokenization operation 102 illustrates that, in some cases, a token may preserve the format in length and data type of the original data value and some of the original data value (e.g., four leading and four ending digits of a credit card number). Tokenization operation 104 illustrates that, in some cases, a token may preserve a number of leading the trailing characters of the original data value, but not necessarily the format in length or the data type of the original data value (e.g., may change from numeric to alphanumeric). Tokenization operation 106 illustrates that, in some cases when a full value is not needed or desirable, a masked value can be produced (e.g., via an encryption operation) from the original value in which a portion (e.g., digits in the body portion) of the original value is masked.

As FIG. 1 illustrates, not all tokenization operations produce format-preserving tokens. Further, tokenization operations may have different requirements. For instance, tokenization operation 102 does not require a change in the application that processes the original sensitive data, but tokenization operation 104 may require a change in the application (e.g., credit card numbers do not hold alphabetic characters). However, tokenization operation 104 shows a type of tokens that might be used in other cases, for instance, to generate a unique token for each use of an original value. This type of tokenization may be useful for some uses, such as when anonymization of data records is needed so that they cannot be matched, but that subsequent reveal of the original sensitive values is also needed.

Figure 2:
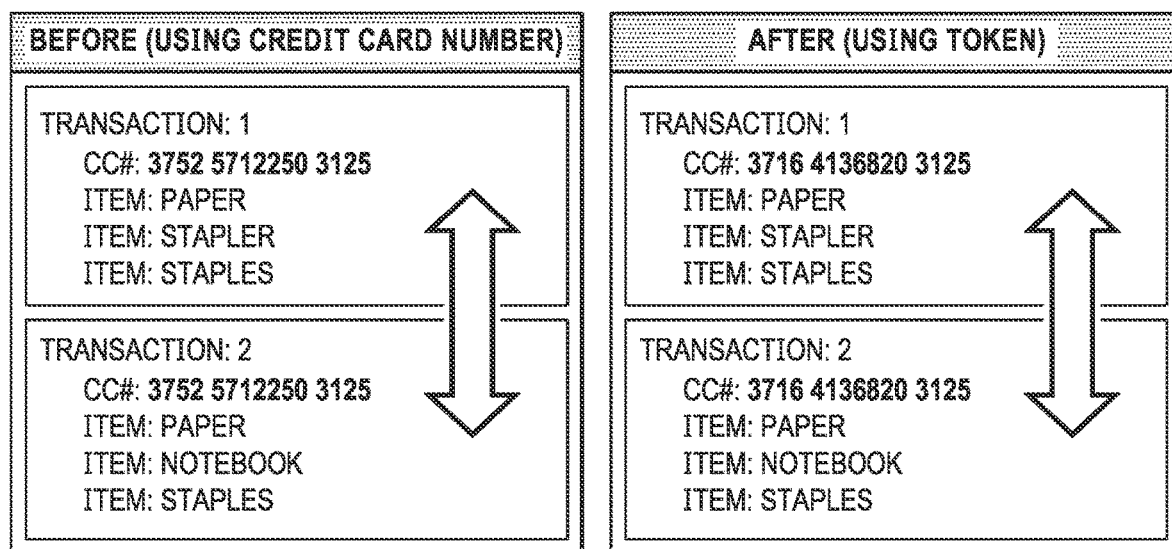
FIG. 2 illustrates an example use of a format-preserving token in place of real data to protect the real data from being revealed during data processing according to some embodiments.

A main benefit of format-preserving tokens (e.g., see tokenization operation 102) is that they can be used as if they were real data. Another advantage is that they do not require any changes in the applications that process them. Such format-preserving tokens can be particularly useful in protecting data values that have a standard length like credit card numbers or social security numbers, as illustrated in FIG. 2. Values that have a variable length, such as addresses, names, etc., can still be tokenized, but the tokens will not retain the length in these cases.

As illustrated in FIG. 2, by preserving the format of the original data, format-preserving tokens can be used for further processing as if they were real data. This differs from encryption in which encrypted data (e.g., see tokenization operation 106) cannot be used for further processing. Referring to FIG. 1, the format-preserving token generated via tokenization operation 102, the non-format-preserving token generated via tokenization operation 104, and the masked token generated via tokenization operation 106 all preserve some values of the original data. However, although the tokenized value in the body portion of the non-format-preserving token generated via tokenization operation 104 might look like an encrypted value, the entire output from tokenization operation 104 is a token and can be revealed at a later time. This is unlike encryption which might require parsing the token, extracting the middle characters, and then decrypting those characters.

Figure 3:
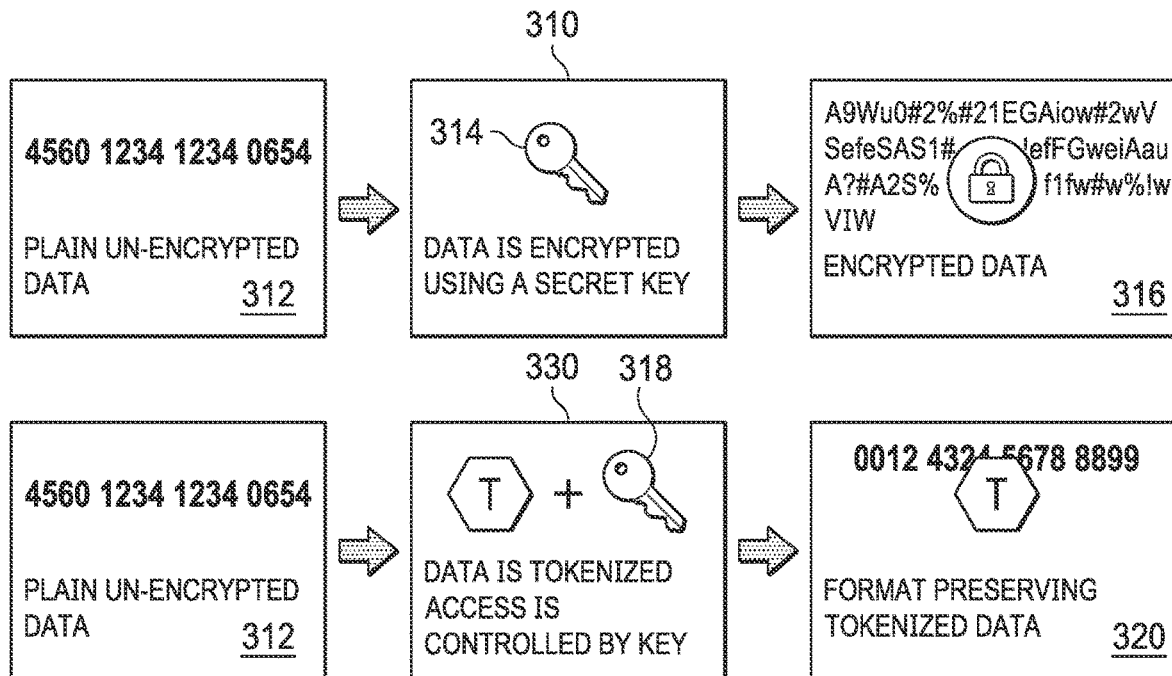
FIG. 3 exemplifies differences between tokenization and encryption and tokens thus generated through these operations.

FIG. 3 exemplifies differences between tokenization and encryption. In the example of FIG. 3, sensitive data (e.g., a credit card number) 312 is encrypted via an encryption operation 310 using a secret key 314. The encrypted data 316, however, does not resemble the original format. This means that the encrypted data 316 cannot be used as input to a subsequent computing facility for further processing (e.g., credit card processing, loan application processing, document production operations, etc.). As a non-limiting example, a data validation operation such as the Luhn Check used in validating a variety of identification numbers, such as credit card numbers, cannot be performed on encrypted data.

While there are exceptions (e.g., format preserving encryption or FPE), most forms of encryption take human-readable data and transform it into a binary-looking format. This is a problem for applications which expect text strings, or databases which require properly formatted data values (e.g., social security numbers that have a very specific format pattern that they need to conform with). The binary values create unwanted side effects and often cause applications to misbehave. Thus, a solution that preserves at least the format, and often the data type as well, is needed.

Tokenization can provide an alternative to traditional encryption. For instance, credit card processing systems usually expect 16-digit credit card numbers. In such credit card processing systems, credit card tokens are typically 16 digits long and may preserve the last four original numbers. In some cases, these tokens can even be generated in a way that allows them to pass the Luhn validation check. However, despite this, such credit card tokens are still random values that are meaningless by themselves.

As illustrated in FIG. 3, in some embodiments, applying a tokenization operation 330 to the same sensitive data 312 can produce a format-preserving token 320 (with a token access key 318) that can be used for further processing, including data validation. In this case, format-preserving token 320 preserves the type and length of the original value, but does not copy any of the leading and/or training characters of the original value. That is, format-preserving tokens can, but do not need to preserve any part of the original sensitive data.

Table 1 below shows that, depending upon the format of values in the data fields, tokens of various types can be generated accordingly (e.g., by an embodiment of a tokenization system disclosed herein), including tokens that may not preserve the format of an original value (e.g., name, address, email address, date, etc.).

TABLE 1

| Data Field | Original Data Value | Tokenized Data Value | Token Type | 1:1 Referential Integrity used |
|---|---|---|---|---|
| Name | Jane Doe | C12x3co4sX42 | Alpha-numeric | No |
| Address | 100 Central Avenue, Atlanta, GA | H456db3co4dd | Alpha-numeric | No |
| Postal code | 30303 | 30123 | Format preserving, numeric | Yes |
| Phone number | 404-123-4567 | 404-749-9836 | Format preserving, numeric | Yes |

TABLE 1-continued

| Data Field | Original Data Value | Tokenized Data Value | Token Type | 1:1 Referential Integrity used |
|---|---|---|---|---|
| Email address | Jane.doe@gmail.com | DI41S46oksn3 | Alpha-numeric | Yes |
| Date of Birth | May 5, 1975 | Sep. 22, 1975 | Format preserving, numeric | No |
| Social Security Number | 260-05-1234 | 451-54-4365 | Format preserving, numeric | Yes |
| Credit Card Number | 5589 5555 6666 7449 | 5589 4789 7643 7449 | Format preserving, numeric | Yes |
| Account Number | A0123456789 | F4857392047 | Format preserving, numeric | Yes |

In Table 1, "referential integrity" refers to the one-to-one connection between a token and a corresponding original data value across applications in an enterprise computing environment. Each time a given value is passed to the tokenization mechanism, the same token will be returned. In such a case, the token value is consistent across the applications. This consistency can be temporal, which means that the token is stable over time. This enables tokens be used as unique identifiers in place of sensitive values in application or analytics scenarios. As such, data analyses (e.g., data analyses performed in integration of data from disparate data sources into one or more central repositories or a data warehouse, data analyses performed in analyzing customer behaviors, etc.) can be applied using the tokens.

As will be explained below, in some cases, a token does not need to have a one-to-one relationship with an original value. For instance, data values like names, salary figures, and other values may not be unique to a particular record or individual. In such cases, one-to-one referential integrity should not be used. Thus, in some embodiments, "referential integrity" can be an optional feature of data tokenization methodologies disclosed herein.

As Table 1 illustrates, different tokenization strategies are suitable for different types of data. For example, the data field "Account Number" could leverage a format preserving alphanumeric token, the data field "Date of Birth" could leverage a format preserving numeric token, and the data field "Name" could leverage an alphanumeric token that does not preserve the format. Similarly, the one-to-one referential integrity could be suitable for some data fields, whereas others could be tokenized without it.

In Table 1, the highlighted characters indicate values that would be retained in the token for analysis purposes, while the characters that make the data value unique are replaced, rendering the value as a whole secure and de-personalized. This kind of tokenization, as well as other tokenization solutions, provides for field-level data protection. In some cases, there might be a need to protect the entire files (e.g., structured/unstructured text files, photos, videos, etc.). Such files are not suitable for tokenization and can be better managed through encryption.

As alluded to above, tokenization has generally been used by various processing application such as EMRS (Enterprise Medical Record System) applications and those that comply with the payment card industry (PCI) data security standard. More recently, tokenization has found utility in enterprise data management applications (e.g., for protecting personally identifiable information (PII) and/or personal health information (PHI) in employee records, patient records, etc.).

As an example, an enterprise can employ and/or operate an enterprise data management platform to natively support the storage, integration, and syndication activities required to supply quality data to the enterprise. Such an enterprise data management platform can operate in a cloud computing environment, providing the flexibility to customize solutions to align with unique data strategies and evolving requirements and allowing the enterprise to harmonize, cleanse, enrich, and aggregate data in a single cloud computing platform to improve process automation and efficiency.

Central to the ability of an enterprise data management platform to harmonize, cleanse, enrich, and aggregate data is format-preserving tokenization, which allows for embedding data inside tokens to enable generation of independent tokens by multiple, independent domains into a single set of tokens. In some embodiments, such format-preserving tokens can be used by an appropriate tokenization system to retrieve the original values. This original-value retrievability distinguishes data tokenization from redaction, masking, anonymization, or other data security approaches.

Figure 4:
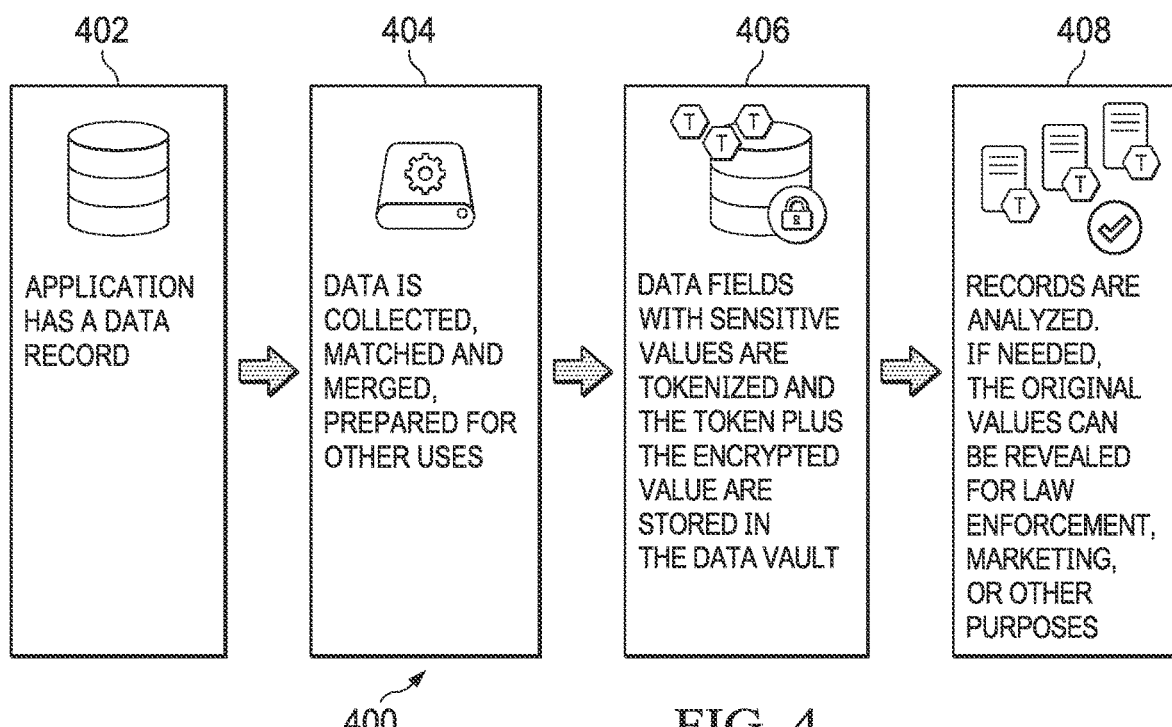
FIG. 4 illustrates an example of a data processing method that utilizes tokenization to produce tokens that can later be revealed.

FIG. 4 illustrates an example of a data processing method 400 that utilizes tokenization for data security. As shown in FIG. 4, a data processing application may have a data record (e.g., an invoice, a credit card statement, a purchase order, a loan application, a customer record, an employee record, a patient record, etc.) that needs to be processed (402).

As a non-limiting example, such a data processing operation may entail collecting, matching, merging, and/or normalizing data (e.g., date, name, address, identification code, account number, invoice number, application number, serial number, parts number, patient identifier, etc.) from the data record and producing prepared, manipulated, or otherwise processed data for use by a downstream computing facility or facilities (404).

In the example of FIG. 4, the data processing application sends a request for data anonymization to a tokenization system (or to a tokenization service, depending upon implementation) and, in the request, indicates data fields in the data record to be anonymized. The tokenization system is adapted for performing a tokenization operation that tokenizes sensitive values in the data fields indicated in the request from the data processing application (406).

In some cases, in addition to tokenization, data encryption may be applied. For instance, the original sensitive values may be encrypted before being stored in a secure data vault. The tokenization system returns the anonymized data to the data processing application and the data processing application, in turn, uses the tokens in the anonymized data to process the record. Where necessary (e.g., for law enforcement, marketing, legal, regulatory compliance, or other purposes), the data processing application can request the tokenization system to perform a reveal operation that reveals the original sensitive values (408).

Traditionally, an original-value retrieval process does not involve interpreting the meaning of a token or performing an operation on a token itself. For instance, if a data file holds social security numbers (SSNs) at a known location (e.g., an XPath, a column in a spreadsheet, etc.), the tokenization operation would replace the SSNs with tokens, and the reveal operation would retrieve the original SSNs from the secure data vault using the tokens and replace the tokens with the original SSNs.

In some embodiments, a "reveal" operation disclosed herein can include interpreting the meaning of a token or performing an operation on the token itself, in addition to retrieving an original value for which the token is generated as a surrogate. Accordingly, this particular type of reveal operation is referred to herein as an anonymizing mapping revealing ("AMR") process. Before describing the AMR process in detail, some context might be helpful.

Data anonymization by tokenization combined with a reveal operation can have utility across many problem spaces. For instance, in data integration use cases (e.g., integrating content services with multiple applications, which can include third-party applications, to bridge content silos and expedite information flows), certain values of sensitive data might need to be manipulated. Referring to referential integrity discussed above, FIG. 5 illustrates how sensitive data can move between applications in an enterprise computing environment.

Figure 5:
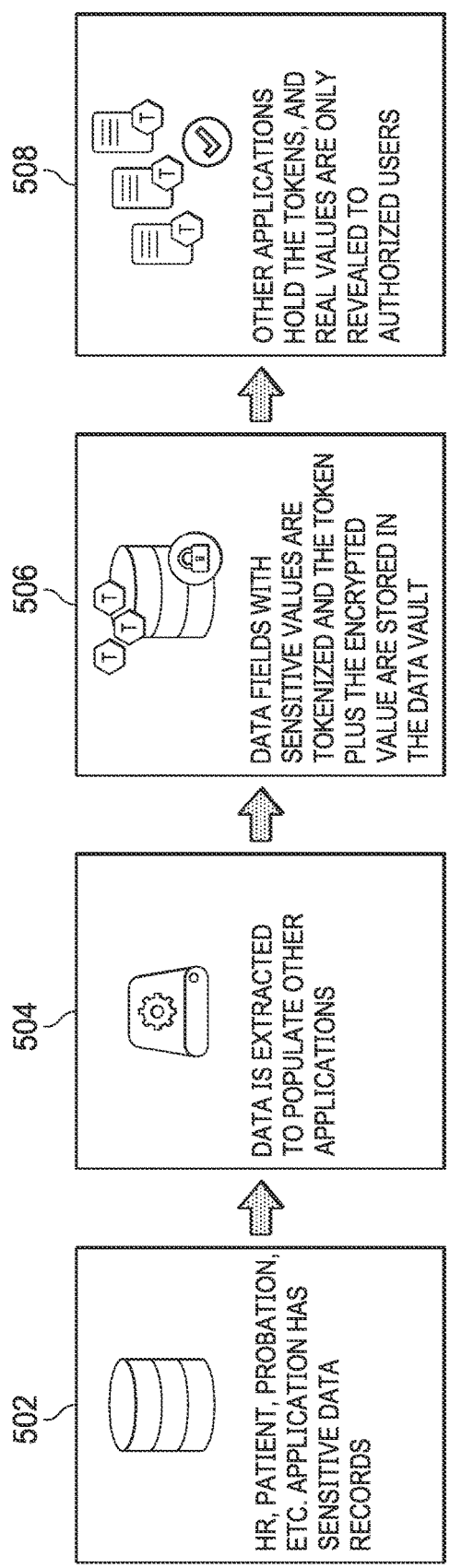
FIG. 5 illustrates how sensitive data can move between applications in an enterprise computing environment.

In the example of FIG. 5, a data processing method 500 may begin with a data processing application having to process data records with sensitive data. For instance, HR records may have sensitive employee data subject to privacy laws and regulation, electronic medical records may have sensitive patient data subject to HIPPA, etc. (502).

In this case, the processing application is adapted for extracting data from the data records. The extracted data is then used to populate other applications in the enterprise computing environment (504).

Similar to data processing method 400 described above, the data processing application may request the tokenization system to anonymize the sensitive data in the data records (506). The tokenization system is operable to tokenize the sensitive data, encrypt the original sensitive data, and store the encrypted original data in a secure data vault.

The secure data vault is not accessible by the data processing application or other applications. Instead, tokens for the sensitive data are returned by the tokenization system to the data processing application and, in turn, the data processing application processes the anonymized data records using the tokens and produces processed data records that can be used by other applications. This means that the other applications can do their processing without as many security restrictions. Other applications may request the tokenization system to reveal the original real values to authorized users through a reveal process (508).

Figure 6:
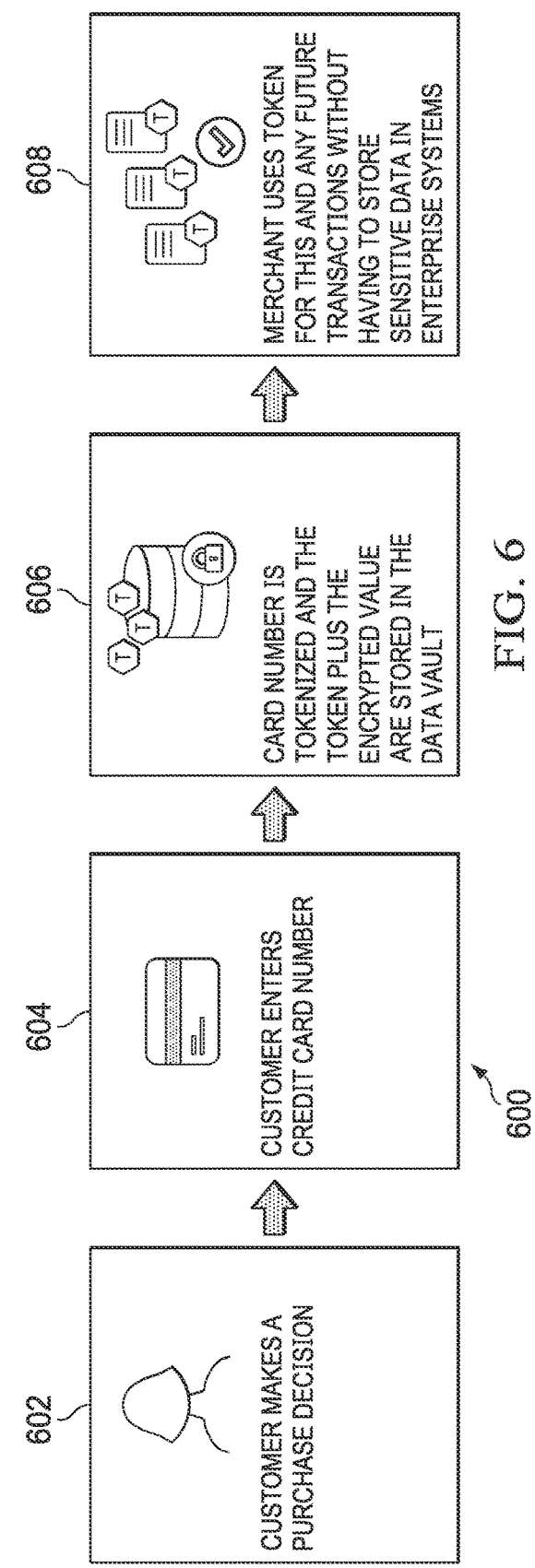
FIG. 6 illustrates a non-limiting example use of tokenization for data security according to some embodiments disclosed herein.

FIG. 6 illustrates a non-limiting example of how tokenization can be used to protect sensitive data, such as a credit card number, and how the tokens can be used multiple times across multiple applications in an enterprise computing environment.

In the example of FIG. 6, a process 600 may begin with a user of a website (e.g., an e-commerce site) making a purchase (602) and entering their credit card details, including a credit card number (604). The website or the shopping cart function of the website provides the credit card number as input to a tokenization service, plug-in, extension, or function which tokenizes the credit card number (i.e., to obtain a token as a surrogate for the credit card number) (606). The original credit card number is then encrypted and stored with the token as a token-value pair in a secure data vault and the token is returned to the tokenization requester (e.g., the website, the shopping cart function of the website, or whichever the function that requested the tokenization). Subsequently, wherever the credit card number is needed, the token for the credit card number can be used (e.g., by the website and/or the operator of the website) in place of the original, actual credit card number (608). In this way, the token can flow to one or more downstream systems or computing facilities, such as a loyalty program, rewards program, analytics, marketing application, database, and so on.

Since the token preserves the format of the credit card number, it can be stored and used outside of the secure data vault while the original, actual credit card number remains encrypted and stored in the secure data vault. Further, since the creation and returning of the token can take only some tens of milliseconds, which is a very short period of time, the impact on the side of the tokenization requester (e.g., customer experience with the website that requested the tokenization) is minimal. As discussed above, the downstream system(s) can have the original, actual credit card number revealed later (e.g., through an AMR process) as needed.

Figures 7, 8:
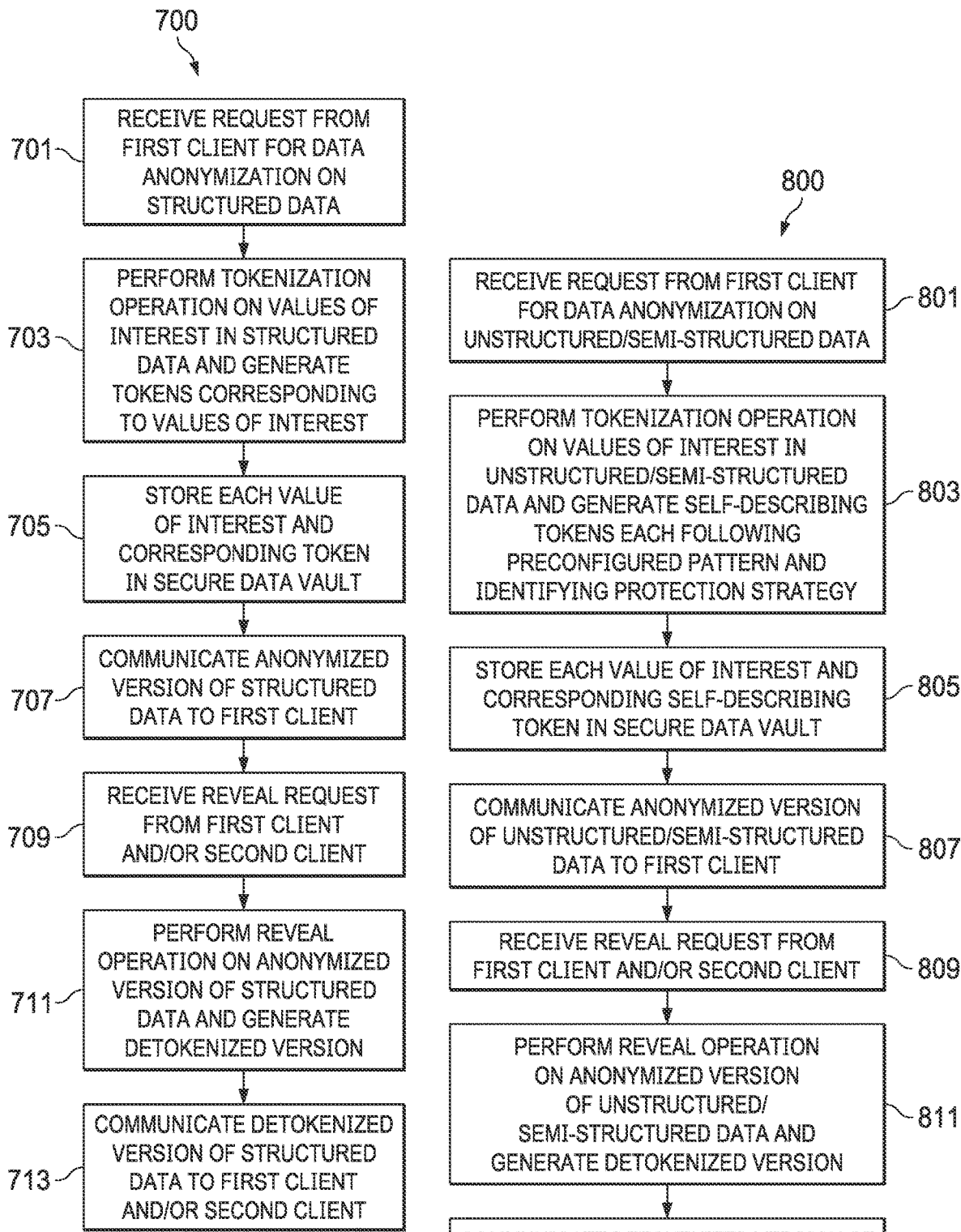
FIG. 7 is a flow chart that illustrates an example of a method for tokenizing sensitive data values in structured data according to some embodiments disclosed herein.
FIG. 8 is a flow chart that illustrates an example of a method for tokenizing sensitive data values in freeform, unstructured data with self-describing tokens having embeddable markers according to some embodiments disclosed herein.

Referring to FIG. 7, according to a first aspect of this disclosure, tokens can be generated and utilized in tokenizing sensitive data values in structured data (even in a single field of data) and the sensitive data values can be revealed in an anonymizing mapping revealing process. In some embodiments, a method 700 for securing data can include receiving, by a tokenization system from a first client computing system, a request for data anonymization (701). In some embodiments, the request referencing a single field of data, file, record, or document having multiple data fields that contain values of interest for the data anonymization. The tokenization system can perform a tokenization operation on the input single field of data, file, record, or document (703). In some embodiments, the tokenization operation can include generating a corresponding token for replacing a value of interest in one of the multiple data fields. The tokenization system can store the value of interest from the input single field of data, file, record, or document with the corresponding token in a secure data vault (705). The tokenization system can return the anonymized version of the single field of data, file, record, or document to the first client computing system (707).

Subsequently, the tokenization system can receive a request for revealing the anonymized version of the single field of data, file, record, or document from the first client computing system or a second client computing system (709). The tokenization system can perform a reveal operation on the anonymized version of the single field of data, file, record, or document (711). In some embodiments, the reveal operation can include searching (e.g., querying the secure data vault maintained by or otherwise accessible by the tokenization system) the anonymized version of the single field of data, file, record, or document, identifying the corresponding token in the anonymized version of the single field of data, file, record, or document, and retrieving the value of interest from the secure data vault using the corresponding token. The reveal operation produces a detokenized version of the anonymized version of the single field of data, file, record, or document. The tokenization system can then return or otherwise communicate the detokenized version of the anonymized version of the single field of data, file, record, or document to the first client computing system or to the second client computing system (713).

In some embodiments, the method can further include splitting a value of interest into multiple regions and generating a token for each of the multiple regions. In some embodiments, a value of interest from the input single field of data, file, record, or document is stored with a corresponding token as a token-value pair in the secure data vault.

As the word "token" implies, a surrogate value typically stands alone. In structured data, such as a data file or database, the value being tokenized is usually in a single field of data, and the token similarly sits in that single field of data (e.g., a single element in an XML file, a single field in a database, a single column in a Comma Separated Values or CSV file, etc.). If a value of interest is split into multiple regions, then a token could sit in a "sub-field" (i.e., a region of a data value that resides in a field).

In unstructured or semi-structured data such as a piece of text or textual document, a value being tokenized is typically separated by whitespace from the preceding or following data value. For instance, a manipulation operation in data integration can entail concatenating a first name and a last name, which are usually separated by whitespace in a document, into a single text string.

Often, to produce an anonymized document from an original document, the string thus created from the concatenation represents a new value having the first name, followed by a space, then followed by the last name. In such a case (which involves manipulating data values and tokenizing regions of the data in a field where parts of a name are tokenized), there are no one-to-one surrogate values to replace the values in the original first name and last name data fields. Thus, it is not obvious where such tokens (in which each token replaces multiple values due to data manipulation) might end up residing in the anonymized document. For such scenarios, self-describing tokens can be generated and utilized in textual content to address this issue.

Self-describing tokens can enable revealing of the original data values from tokens embedded in text, such as in a word processing document. Because a sensitive data value could appear in any part of a textual document, there is not an easy way to know ahead of time where a token might be in the document.

In some embodiments, where string operations are performed on the tokens in a tokenization process, self-describing tokens are generated so that they can be identified in data fields or in textual data. Such self-describing tokens are recognizable in an AMR process so that the original values can be inserted later, even if string operations have been performed on the tokens.

As compared to tokens in structured data described above, tokens in unstructured or semi-structured data such as text will have additional requirements, including, but are not limited to:

Tokens must be easily recognizable. Both humans and automation must be able to recognize that a given sequence of characters in text is a token and not a normal word.

Tokens must identify how to reveal the data value, plus the distinct value of the token itself. In some embodiments, self-describing tokens utilize a mechanism called a "Protection Strategy," which specifies both the data vault that relates the token to the original value and the mechanism used to generate the surrogate value. In some embodiments, such a token may need to indicate which vault that can be used to reveal the value. This means that for 1-1 tokens, if several protection strategies use the same bits in the surrogate value, the tokens will never have a false positive. They will be guaranteed to be different. A self-describing token can capture all of this information in the text of the token.

For instance, a computing environment may have a multiuser domain capability that lets multiple tokenization servers manage a set of tokens. In some embodiments, specific bits in the token can be used to identify which of the multiple tokenization servers created the token. In this way, both high availability and high performance can be attained. Having a region in the data of a token that indicates a particular vault enables uniqueness of tokens. That is, even if all the other bits are identical, the tokens will still be distinct because they came from different vaults. This can be an important feature mainly because different tokenization strategies, which work with different vaults, do not need to coordinate their activities—having a region of bits that indicates the vault where the corresponding token-value pair resides means that no token will ever be truly duplicated, even if some of the bits may be duplicated.

Using names as a non-limiting example, there might be a vault of person names which hold the first names, last names, etc. of people. There might be another vault that holds enterprise names. Each of these two vaults would have a different code for the vault.

As discussed above, the ability to enable data integration based on tokens is referred to as a protection strategy. The protection strategy specifies a technique for generating or formatting a token for an actual, real value, as well as for mapping between the generated tokens and the real values. Before describing this protection strategy in detail, it might be helpful to discuss the challenges in using tokens in more complex situations, particularly the following scenarios.

Protecting Data Records: When working with data records composed of multiple fields of data, different records often share values. For instance, multiple records might hold the first name "John" or hold the zip code "85016". If each record that contains these values uses the same token, then a set of data records or some values in those records can, under some circumstances, be reconstructed.

As an example, assume that record-specific tokens are used for the real values. Tokenizing a value R would require passing the tuple (ProtectionStrategy, RecordIdentifier, R) to the tokenization mechanism. Revealing the real value of a token T would require the tuple (ProtectionStrategy, RecordIdentifier, T). An exception here is that the actual data values might be needed for matching records. For instance, for an analytics use case based on geographic regions, the zip code might be meaningful data that is used to match or group records. In that case, either the zip code would need to remain in clear-text (i.e., not tokenized) or every instance of the zip code would need to have the identical token.

Normalized Data Values: In some cases, certain values might need to be normalized prior to tokenization. For instance, a date value might need to be converted to a standard format, a person's first name to have only its first letter capitalized, a Zip+4 to be converted to a 5-digit zip code, etc. Thus, in some cases, prior to tokenization, a normalization operation might need to be performed on clear-text values during data ingestion so as to produce normalized values and then tokenize the normalized values.

Manipulated Data Values: For illustrative purposes, the following example of a tokenization process assumes that a person has a first name and a last name and does not address the complexities that result from a person having multiple, space-separated parts in their name.
1. Data arrives in firstName and lastName fields (which are used by a first system).
2. The values are concatenated (separated by a space) into a Name field used in a second system.
3. The values in the Name field are later manipulated to populate First and Last fields (which are used by a third system).

The data would then be in the following three distinct shapes, as illustrated in this example:
1. The firstName field holds "George" and the lastName field holds "Washington".
2. The Name field holds "George Washington".
3. The First field holds "George" and the Last field holds "Washington".

In a typical tokenization process, tokens would be assigned to the first and last names.

Using the protection strategy FirstPS for the first name and LastPS for the last name, two tokens would be generated as follows:
"George">>"f123" in FirstPS
"Washington">>"L456" in LastPS Problem 1: Assume that the Name field must be used to generate a PDF report that shows the person's actual name. The Name field holds the tokenized value "f123 L456". One of the challenges is that the system needs to be able to recognize whether the value in the Name field "f123 L456" is a single token for a person's entire name or whether the value holds two tokens. Assume that the system knows that this value is the first-name and last-name token, then the system has to decide whether to:
 a. compose a special reveal operation that performs the substring operations, looks up the first name from FirstPS, looks up the last name from LastPS, and then concatenates the names; or
 b. make each token self-describing. This means that the system is adapted for taking a string that might include one or more self-describing tokens and then replacing the self-describing tokens with the real values.

In this disclosure, a self-describing token refers to a special type of token that follows a preconfigured pattern and that identifies the protection strategy as well as the unique token value. The additional information allows a tokenization system that processes the document, file, or record to identify a self-describing token that is embedded in a larger text string.

For instance, suppose a tokenization system is configured for recognizing that a self-describing token has a pattern that begins and ends with a bracket, that the first character after the bracket indicates the protection strategy, and that the remaining characters are the token value. Then, if FirstPS is identified by the protection strategy 'a' and LastPS is identified by the protection strategy 3', then the self-describing tokens for the above example would be generated as follows:
"George">>"[af123]"
"Washington">>"[$L456]"

Using the self-describing tokens, the tokenization system could then correctly reveal the real values reliably such as:
"[af123][$L456]">>"George Washington"
"[$L456], [af123]">>"Washington, George"

As a further example, suppose a record has a composed key where a record identifier is based on a person's last name. Following the example above, the record might have a recordID of "PERSWashington325". In that case, if the tokenization operation takes place prior to creating the recordID, then the recordID becomes a tokenized key, "PERS[$L456]325", with an embedded token. Applying the reveal operation to the composed key with the embedded token produces the actual record identifier as follows:
"PERS[$L456]325">>"PERSWashington325"

This approach enables the use of self-describing tokens in concatenation operations and on some substring operations and still be able to restore the initial values if needed.

However, a substring operation on a token would return a portion of a token, which would be unusable for the revealing process. This means that, in some cases, certain operations on self-describing tokens would need to be prohibited if the real values need to be revealed and restored later. For instance, a substring operation, substring(String value, int start, int length), generally produces a set of characters, starting with the start character, and specifies the length of the characters extracted. As a non-limiting example, substring("John", 2, 2) will produce "oh." However, suppose "John" is tokenized as "Paul," then performing a substring operation on the token value "Paul" would produce "au." In this example, because the sensitive data value "John" is stored in a secure data vault as a token-value pair with "Paul," the output "au" from the substring operation cannot be used to retrieve and reveal the original sensitive value "John."

Additionally or alternatively, the tokenization system would need to operate intelligently. For instance, a substring operation could be performed if the tokenization system is adapted for examining the input data, recognizing any self-describing tokens, revealing the real values using the self-describing tokens, and then performing the substring operation on the real values. A risk here is that this approach may create leakage as parts of the real values might end up in the clear. To this end, an alternative implementation for data manipulation is to scan the incoming data, reveal the real values using the tokens, insert the real values, perform the data manipulation operation (e.g., a substring operation), and then create a new token in a separate protection strategy for the entire returned value.

Additional operations that could benefit from the approach above include:
  Reformatting date, time, or numeric values (which, ideally, could be a reveal step which produces a formatted value out of the token). A possible variant here can include an indication of the date, time, or numeric format as part of the token value.
  Arithmetic operations, such as adding two numbers, or performing date and time arithmetic (e.g., adding a day or converting a value to a new time zone).
  Numeric rounding or truncation While such operations might be rare, they do occur in real-world data mappings and data manipulation.

In addition to data manipulation operations, another challenge is that the system may need to be able to perform query operations that involve sensitive data, for instance, looking up values from a table of data in a database or from an API, potentially using a query language such as SQL or GraphQL. If there is a one-to-one relationship between tokens and real values, the lookup data can hold the tokens and lookups can be performed. However, values that are returned may need to be tokenized as part of the return path. If there can be many tokens for a given real value, then one option is to:
  Have a Lookup function that takes in a token, the record identifier (if required), and a flag RT (which stands for return) that indicates whether to tokenize the return value.
  Reveal the real value for any tokens handed to the lookup function as parameters.
  Perform the lookup operation using the real values.
  If RT is true, tokenize and return the looked-up value, else return the looked-up value.

Such an implementation would support lookups on record-specific keys, but would require that the lookup table be held in a secure data store.

Yet another challenge relates to excluding sensitive values from test data, as required by many data protection standards. In some embodiments, test data can be tokenized following the vault-based tokenization approach disclosed herein, with different kinds of data values tokenized differently, for instance:
  For data following a pattern defined by a sequence of characters, such as social security number, credit card number, etc., test data can be tokenized utilizing format-preserving tokenization.

For data in a non-textual value space, but with a textual representation, such as date, time, numeric values, test data can be tokenized in multiple ways. Because these types of data have a value space but may have many different syntaxes for how the values are represented in documents, they may be handled differently. In some embodiments, a tokenization system (e.g., tokenization system 700) may generate tokens that match the desired textual representation. An option here is to generate a token value for each original value, and then to represent that value in the current textual format. For instance, for a value V <<Aug. 13, 2019>>, the system would generate a token value T <<Sep. 5, 2024>>. However, when the system comes across 20190813 in an Electronic Data Interchange (EDI) document (i.e., in the YYYYMMDD format), it would generate and insert a token 20240905 for the original date value 20190813. Subsequently, in a transformation, the token value can be converted to a YYYY-MM-DD format, which produces 2024-09-05. When this transformed token value is processed in a reveal process, the original date value 2019-08-13 is revealed. Alternatively, a token could have a 2-part key. For instance, suppose some data records have SSNs present (i.e., the SSNs will always be available or can be looked up). Then, if a document has <<Aug. 13, 2019>>, the token value for one SSN might be <<Sep. 5, 2024>>, but the token value for a second SSN might be <<Dec. 3, 1024>>. The reveal operation would then require both the token value and the SSN. As a non-limiting example, suppose the SSN might be the record identifier, a record-specific token might be used for the date. Thus, there might be three parameters—the record identifier, the value of the token, and the protection strategy.

For data in a non-textual value space that needs to be compared. Sometimes the system may need to perform data manipulation operations such as comparing two dates and determining a date difference, or perhaps summing up a set of prices to produce a total. This type of data manipulation operations generally do not work well on tokens. One solution is to reveal the original non-textual data values, perform the addition or whatever data manipulation operation to produce transformed non-textual data values, and then tokenize the transformed non-textual data values. Another solution is to leave the non-textual data values in clear text in User Acceptance Testing (UAT) data so the values can be computed and revealed.

For data that has distinct regions in the value (e.g., a Name value (which might have First, Last, MI information separated by spaces), a Street Address value (if it is broken up into fields during mapping, etc.). These separate chunks of text, which are referred to as "regions" herein so as not to be confused with "tokens" or "fields"), in the test data can also be tokenized, for example, by generating a separate token for each of the regions in a data value (e.g., the Name data value is split up into up into a first-name region, First, and a last-name region, Last, with a first-name token for the region First and a last-name token for the region Last. The original values in these regions could still be revealed later. As discussed above, in some cases, two-part token keys may be needed for certain data types (e.g., SSNs, dates, etc. that do not also have a record identifier as part of the token key) and UAT data and other test data might be handled separately (i.e., without tokenization).

As a non-limiting example, test data tokenization might involve the following stages:

Test Data payloads arrive, store each payload encrypted in an enterprise content management system (e.g., a content server with a secure repository, referred to herein as Content Server) operating in an enterprise computing environment.

Identify sensitive data values (e.g., credit card numbers, SSNs, etc.) that will always be tokenized through format-preserving tokenization, and non-format preserving sensitive data values (e.g., dates, numbers, names, etc.) that will be tokenized in anonymized test data but not in UAT data. In some embodiments, identification of various types of sensitive data values is performed for both the source and target format.

Tokenize all the identified (marked) sensitive data values to produce anonymized test payloads and store them in Content Server.

Tokenize only the UAT values, and store each payload encrypted in Content Server. A final review of the mapping is performed with this UAT test data, and the results can be presented to a client system (which provided the payloads).

Data arrives for UAT. UAT tokenization is performed by the tokenization system automatically programmatically. During UAT tokenization, the original sensitive data is not visible to users of the system being tested. Data produced by the system being tested flows to the client system which provided the original data and/or to a downstream system. When needed, the original sensitive values can be revealed on the way to the downstream system.

In some cases, authoritative regression test data can be captured by performing anonymizing tokenization for the input data, running the data through the system being tested, and capturing the output data. Suppose an applicable rule (e.g., a rule that checks whether the order date and ship date are within 30 days of each other) requires certain type of data manipulations that are not suitable for tokenization, the token values may be manually edited on a case by case basis, so as avoid having to reveal values used in anonymized test data).

In some cases, map development can occur on anonymized payloads. Here, "map development" refers to building data mappings (i.e., data transformations) between input data and output data. For a more detailed discussion on data mapping, readers are directed to U.S. patent application Ser. No. 17/471,998, filed on Sep. 16, 2021, entitled "ARCHITECTURE FOR DATA MAP CONVERTERS," which is incorporated by reference herein. Using tokenization approaches disclosed herein in data mapping can be useful in data integration, software development, and other operations where a need to protect sensitive data values exists. For example, a formatting-preserving token can be used to preserve contextual information for a value of interest and maintain the structure of the value of interest. Since the formatting-preserving token can be processed like the real data, it can serve as a surrogate for the value of interest in these operations, even if third-party entities (humans and/or machines) might be involved.

Referring to FIG. 8, according to a second aspect of this disclosure, some embodiments of self-describing tokens with embeddable markers can be generated and utilized in tokenizing sensitive data values in freeform, unstructured data. The sensitive data values can be revealed in an anonymizing mapping revealing process. Accordingly, in some embodiments, a method 800 for securing data can include receiving, by a tokenization system from a first client computing system, a request for data anonymization, the request referencing a single field of data, file, record, or document with unstructured or semi-structured content that contains values of interest for the data anonymization (801). The tokenization system can perform a tokenization operation on the input single field of data, file, record, or document (803). In some embodiments, the tokenization operation can include generating a self-describing token for replacing a value of interest in the unstructured or semi-structured content. In some embodiments, the self-describing token can have a preconfigured pattern, an indication of a protection strategy, and a token value. In some embodiments, the tokenization operation produces an anonymized version of the single field of data, file, record, or document with self-describing tokens, each anonymizing and corresponding to one or more of the values of interest in the unstructured or semi-structured content. In some embodiments, the tokenization system can store the values of interest from the input single field of data, file, record, or document in a secure data vault (805). In some embodiments, the tokenization system can return the anonymized version of the single field of data, file, record, or document to the first client computing system (807).

Subsequently, the tokenization system may receive a request from the first client computing system or a second client computing system for revealing the anonymized version of the single field of data, file, record, or document (809). In response, the tokenization system can perform a reveal operation on the anonymized version of the single field of data, file, record, or document (811). In some embodiments, the reveal operation can include searching (e.g., querying the secure data vault maintained by or otherwise accessible by the tokenization system) the anonymized version of the single field of data, file, record, or document for the preconfigured pattern, identifying the self-describing tokens in the anonymized version of the single field of data, file, record, or document using the preconfigured pattern, and retrieving the values of interest from the secure data vault using the protection strategy and the self-describing tokens. The reveal operation produces a detokenized version of the anonymized version of the single field of data, file, record, or document. The tokenization system can then return or otherwise communicate the detokenized version of the anonymized version of the single field of data, file, record, or document to the first client computing system or to the second client computing system (813).

In some embodiments, the method may further include examining the single field of data, file, record, or document, retrieving and revealing the values of interest from the secure data vault using the self-describing tokens, inserting the values of interest where the self-describing tokens reside in the freeform, unstructured data, performing a data manipulation operation on the values of interest, the data manipulation operation producing a transformed data value, and creating a new token using a separate protection strategy for the transformed data value. In some embodiments, the data manipulation operation can be a substring operation.

In some embodiments, the method may further include identifying whether the data manipulation operation performed on a value of interest splits up the value of interest (which was already tokenized) and, responsive to the value of interest being split up into multiple pieces, creating a new token for each of the multiple pieces, and replacing the value of interest with the respective new tokens after the data manipulation operation is performed.

As discussed above, the original-value retrievability distinguishes data tokenization from redaction, masking, anonymization, or other data security approaches. Particularly, some computing platforms can already detect and redact sensitive values in text. For example, if a document contains a credit card number, the card number could be replaced with X's plus the last for digits of the credit card number.

However, redacting values in text is not suitable if:
The text will be copied. This means that the relationship to the original document is not machine identifiable, and the redacted value needs to be looked up later. Because the relationship to the original document is lost, locating the original value might be too labor intensive.

A document has multiple sensitive values scattered throughout text, and those values are redacted. In such scenarios, ensuring that the right portion of the original document is identified can be too labor intensive.

Data in the text needs to be extracted and related to other data values. Because redaction obscures much of the original data, false positives can occur (e.g., many credit card numbers can have the same last 4 digits).

For all of these scenarios, a surrogate value could be introduced. As a non-limiting example, a masked value generated for a credit card number could contain X's and the last four digits of the credit card number. However, a surrogate value generated through a tokenization system disclosed here can preserve the structure (e.g., format and length) of the original credit card number. Since the surrogate value of the token can be used in place of the original credit card number (e.g., see output of tokenization operation 102 shown in FIG. 1) and would not be all X's, the surrogate value can be used to locate the original credit card number. Thus, utilizing tokenization technology disclosed herein for redaction can advantageously allow for recovery of original values such as text, numbers, alphanumeric values, etc.

Today, there exist techniques and tools that can detect and redact textual content in documents of a certain file format (e.g., a portable the format that provides an electronic image of text or text and graphics that looks like a printed document and can be viewed, printed, and electronically transmitted). However, these techniques and tools remove the original content from a document and provide a marker that the original content was removed. Similar techniques can be applied to documents in other file formats, such as a document format, Rich Text Format (RTF), or the like, in order to redact text or images and to make visible to users that the content was removed.

In all these cases, if a document is generated such that redaction has removed content, or if a portion of a redacted document is copied but with content removed, recovering the original content later can only be achieved by going back to the original document. This disclosure provides an alternative, token-based mechanism for letting authorized parties retrieve the original content utilizing tokens corresponding to the original content, without needing to go back to the original document.

As discussed above, in this disclosure, tokenization refers to the ability to replace content in a document with a surrogate value so that authorized parties can "reveal" the original value at a later time. In some embodiments, the steps to tokenize values in a document for redaction can include:
Identify a portion of a document as being sensitive.

Edit the document and replace the thus identified original sensitive content in the document with a "token" (and, optionally, the altered region of the document is marked so a reader can see a change was made).

The resulting document can be used and distributed as it no longer contains the original sensitive content.

The "editing" process can be automatic. For instance, for a proprietary format developed by MICROSOFT® (e.g., .docx), application programming interfaces (APIs) such as those of the APACHE® POI (which stands for Poor Obfuscation Implementation) project, can be used to edit a document and insert tokens in place of sensitive content found in the document.

Some embodiments disclosed herein rely on vaulted tokenization in which the original content and the token(s) are stored in a secure data vault. The vaulted tokenization enables:
Avoidance of two or more original values having the same valid token.
Different pools of tokens, for instance, each court case might have a separate data vault.
Later reveal of the original value to authorized parties.
An ability to let tokens time out by forgetting the relationship to the original value, but still be able to avoid creating duplicate tokens.
An ability to preserve referential integrity, i.e., have a single token for an original value, such as for a SSN or a person's name, that will be used while tokenizing multiple documents, databases, etc.

Some embodiments disclosed herein do not require vaulted tokenization. The last point, referential integrity, can be very important under certain circumstances. For instance, if a legal team needs to build a court case based on redacted documents, they cannot correlate the redacted content between the different documents (or databases). However, leveraging data tokenization disclosed herein, a team could recognize that the same content is referenced in multiple documents, even though they cannot see the original value (e.g., SSN, person's name, etc.).

To this end, a token can be in one of several different forms, such as:
A textual value, for instance, a token for SSN 123-45-6789 might be 9923-12-8876, or any similar textual value that is not the original value.
An image that contains a token identifier as metadata (e.g., information that is embedded in the image via some mechanism) and can optionally include the token identifier as a human-readable image. A "token identifier" can be any data that can be used to look up the original value in the data vault and that has the characteristics of a token as described above. As a non-limiting example, a variation of self-describing token can be utilized as a token identifier where a token value is identified through a pattern that marks the start and the end of the token value. For this reason, it is also referred to as a patterned token.

In all these cases, once a portion of an original document has been identified as needing to be tokenized, automation can edit the original document and produce a transformed document that has been tokenized (in which each original sensitive value is redacted, replaced, or otherwise obscured by a token). However, unlike conventional redaction, automation can be utilized to programmatically reveal the original values in the document.

When updating a document, as with redaction, it is reasonable to mark to the human that the content has been edited. To this end, in documents of certain file formats, highlighting can be used so that the change(s) to the document is obvious to a human reader. In a textual document such as an ASCII file, a marker could be used to visually identify a token to a human reader. For instance, single brackets, one at the start and one at the end of a token, can be used. As a non-limiting example, '[' can be used to mark the start of a token and ']' can be used to mark the end of the token. Any appropriate marker can be used, so long as the marker is not a pattern common in the document such that the presence of token itself can be recognized by a human or automation and "false reveals" do not occur during a reveal process.

While not required, it is often preferable that an automated process can identify tokens in a document, such as by recognizing a distinctive pattern (e.g., the '[' and ']' in text) so as to be able to automatically reveal values later. Unlike other tokenization strategies disclosed herein, patterned tokens useful for redaction require only two pieces of information: a token value and an embedded signal (e.g., a distinct pattern using symbols, numerical values, or even characters, etc.) that marks the start and the end of the token value.

In some embodiments, a user interface (UI) can be provided for human users to mark or review regions in a document to be redacted through tokenization. Any suitable marking techniques may be used, even a different font or size of the same text in a region. This type of human interactions with the UI for marking or reviewing regions in a document for tokenization does not compromise the distinctive nature of this invention.

In addition, with this invention, data in databases can be obscured, which is not possible with redaction. Referential integrity can be preserved within a set of documents and databases. Also, content can be replaced with tokens without marking in the document or database the fact that an alteration occurred, should a user desire to do so.

If images are tokenized, one implementation is to:
Send the image (e.g., in JPEG file format) to a service.
Optionally, determine whether the image is known to the tokenization system. If so, return an existing token that correspond to the image and stop.
Insert the image into a data vault (e.g., some sort of a vault for tokens for images), along with the metadata or other tag value. Optionally, generate an image T that includes the tag value. Return the tag value and, optionally, the image T.
Update the original document to replace the affected region with results returned from the preceding step.

As a non-limiting example, suppose a document contains both textual information and image information. In some embodiments, a computing system (e.g., one that is powered by an artificial intelligence (AI) information processing platform) can search the document for related sensitive information and remove altogether in an automated recognition operation (e.g., using a pattern matching technique to locate the related sensitive information and replace same with tokens generated by an embodiment of a tokenization system, service, or tool).

While this automated recognition operation can be performed by AI, a human user can likewise utilize the tokenization system, service, or tool disclosed herein. This invention can take as input, from AI or a human user, a string of characters (e.g., name, SSN, CCN, etc. detected by AI or provided by a human user by marking up the document utilizing a pointing device) and utilize one or more tokenization strategies disclosed herein to create tokens for the values encountered by AI or the human user.

In this example, the tokenization system, service, or tool redacts the visual information (e.g., the image information) but tokenizes the textual information. Alternatively or additionally, the tokenization system, service, or tool may tokenize the textual information that describes the image.

Figure 9:
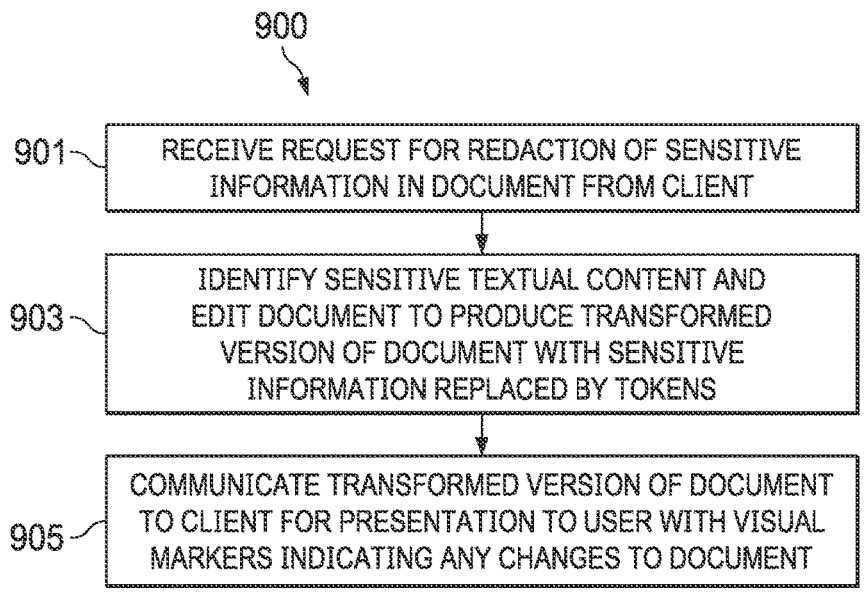
FIG. 9 is a flow chart that illustrates an example of a method for utilizing tokenization for redaction of sensitive textual content in documents of various format according to some embodiments disclosed herein.

Referring to FIG. 9, according to a third aspect of this disclosure, some embodiments of patterned tokens can be generated by a tokenization system and utilized, for instance, by an automated recognition service, a plug-in to a frontend user tool, etc., for redaction of sensitive textual content in documents of various format. Accordingly, in some embodiments, a method 900 for securing data can include receiving, by a tokenization system from a client computing system, a request for redaction of sensitive textual content in a document (901). The tokenization system is configured for identifying a portion of the document as the sensitive textual content and editing the document accordingly (903). For instance, tokenization system may replace the sensitive textual content thus identified with tokens, each token having a token value and a pattern that identifies a start and an end of the token value. This editing can produce a transformed version of the document with the tokens and without the sensitive textual content. The tokenization system can then return or otherwise communicate the transformed version of the document with the tokens and without the sensitive textual content to the requesting client computing system (905).

In some embodiments, the method can further include marking the tokens with visual markers and presenting the visual markers with the transformed version of the document through a user interface so that changes made to the document are visible to a user through the user interface. In some embodiments, the pattern comprises brackets, where the start comprises a first of the brackets and the end comprises a second of the brackets. In some embodiments, the sensitive textual content is stored in a secure data vault.

As discussed above, in some embodiments, a tokenization system, service, or tool implementing an embodiment disclosed herein may leverage different data security strategies to redact and/or tokenize different types of information in a document, e.g., redacting image information but tokenizing textual information. The textual information can also have multiple types, e.g., structured, unstructured, semi-structured, etc.

As discussed above, for structured content, a token may have a one-to-one connection with a sensitive data value for which the token serves as a surrogate. This one-to-one connection enables the token to be utilized for further processing in place of the sensitive data value. Thus, format-preserving tokenization may be more appropriate for structured content. For unstructured or semi-structured content where data manipulation may affect (e.g., splitting up a sensitive data value, concatenating multiple words into a text string, etc.) the one-to-one connection between a sensitive data value and a corresponding token, a self-describing token may be more appropriate. This is particularly the case where a value is found in a field of data that has been tokenized, but the value is more than a token contained in the field. A self-describing token can enable a system to recognize that the token is embedded with some other data.

In some cases, a document may be highly structured and yet contains a block (or multiple blocks) of freeform text in the document. For instance, a physician's note may be a structured document with structured data fields for a patient's first and last names and with a block of text that mentions the patient's first and last names which can be considered as sensitive information.

A data processing application that is responsible for processing the physician's note can employ the tokenization system, service, or tool (e.g., a function, a plug-in, an extension, etc.) to pre-process and categorize sensitive information in the structured fields as well as in the freeform text. In turn, a tokenization engine (e.g., a token manager of the tokenization system) can return format-preserving tokens for the sensitive information in the structured fields and self-describing tokens for the sensitive information in the freeform text that cross-reference the patient's first and last names in the structured fields. While the format-preserving tokens may have a one-to-one connection to the sensitive information in the structured fields, the self-describing tokens may not. Again, the issue here is that a format-preserving token is suitable for a field of data, but may not be recognizable in a block of text. As disclosed herein, a solution is to compose a self-describing token that uses a format-preserving token as its body, but includes a start indicator, an end indicator, and a flag that indicates how to reveal the token.

Figure 10:
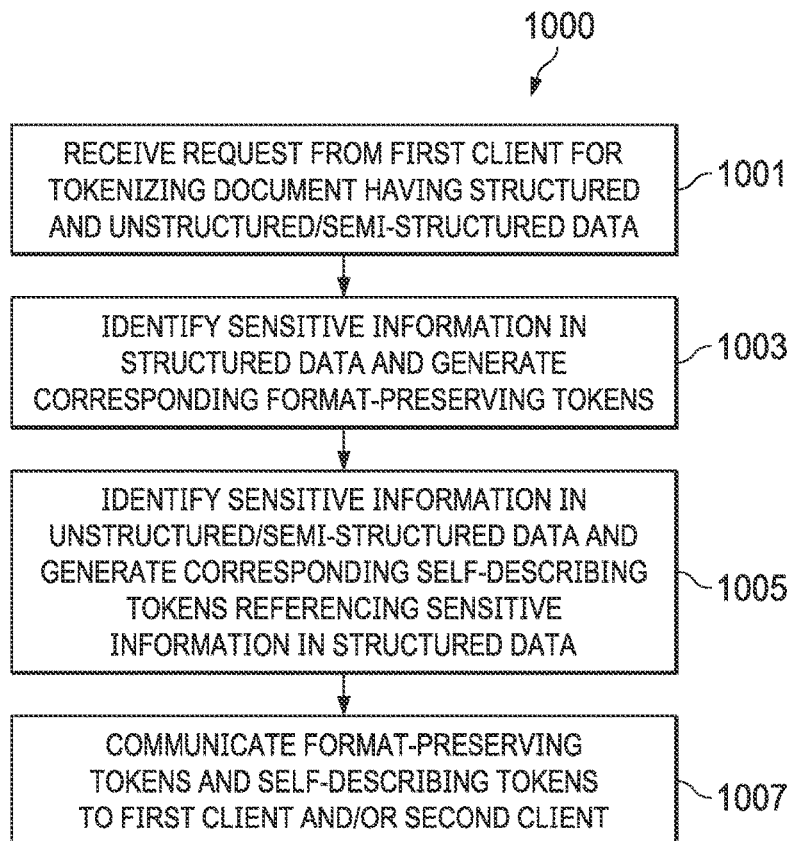
FIG. 10 is a flow chart that illustrates an example of a method for tokenizing a document with structured and unstructured and/or semi-structured data according to some embodiments disclosed herein.

Referring to FIG. 10, according to a fourth aspect of this disclosure, in some embodiments, a method for securing data can include receiving, by a tokenization system from a first client computing system, a request for tokenizing a document with a first portion for structured content and a second portion for unstructured or semi-structured content (1001). In some embodiments, the tokenization system is configured for identifying sensitive information in the first portion of the document and generating format-preserving tokens for the sensitive information in the first portion of the document (1003). In some embodiments, the tokenization system is further configured for identifying sensitive information in the second portion of the document and generating self-describing tokens for the sensitive information in the second portion of the document (1005). The self-describing tokens cross-reference the sensitive information in the first portion of the document. The tokenization system can then return or otherwise communicate the format-preserving tokens and the self-describing tokens to the first client computing system or a second client computing system (1007).

In some embodiments, a format-preserving token has a one-to-one connection to the sensitive information in the structured content. In some embodiment, a self-describing token has a preconfigured pattern, an indication of a protection strategy, and a token value.

Figure 11:
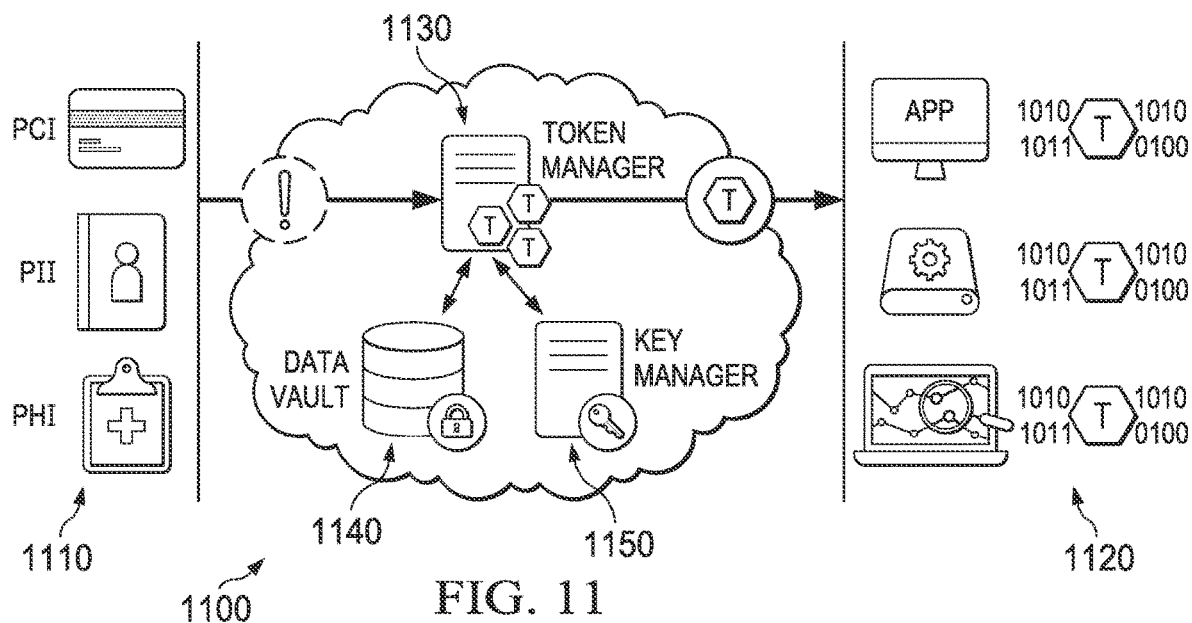
FIG. 11 depicts a diagrammatic representation of an example of a tokenization system according to some embodiments disclosed herein.

FIG. 11 illustrates a non-limiting example of a tokenization system 1100 adapted for taking original sensitive data values (e.g., PCI data containing credit card numbers, PII data in human resources files, PHI data in medical records, etc.) 1110 as input and generating corresponding tokens 1120. Depending upon use cases, tokens 1120 may or may not preserve the format of the original sensitive data values. Further, tokens 1120 may or may have one-to-one referential integrity in connection with the original sensitive data values.

As illustrated in FIG. 11, tokenization system 1100 can include a token manager 1130, a data vault 1140, and a key manager 1150. Token manager 1130 can be configured for centrally managing tokens generated by tokenization system 1100. Secure data vault 1140 can be configured for centrally storing various types of tokens generated by tokenization system 1100. The tokens may be stored in secure data vault 1140 with corresponding values of interest and/or with references to such values of interest stored elsewhere. Key manager 1150 can be used when encryption is applied. For instance, in storing an original sensitive data value in a secure data vault 1140, tokenization system 1100 may obtain a key from key manager 1150 such that access to the original sensitive data value is controlled/managed through the key. Examples of a key manager and how to use tokenization for integration use cases can be found in U.S. Pat. No. 8,805, 204, which is incorporated by reference herein.

In some embodiments, tokenization system 1100 can be implemented in a cloud computing environment and provide a cloud-based tokenization service that leverages vault-based tokenization approach for protecting any type of sensitive data values (e.g., PCI, PII, PHI, and/or other types of sensitive data. Technical features of tokenization system 1100 can include, but are not limited to, the following:

Vault-based tokenization solution that protects sensitive data while enabling downstream systems to reveal the original sensitive data values as needed.

Format preserving tokenization that maintains the length and format of original data.

Optional field-level tokenization that provides one-to-one referential integrity between original data and tokens.

NoSQL database(s) that can provide high-volume, high-speed handling of requests with average response times of less than 30 milliseconds per request (not including network latency). NoSQL ("not only SQL") databases are non-tabular and store data differently than relational tables. Depending upon the data model, NoSQL databases provide flexible schemas and can come in various types, including document, key-value, wide-column, and graph.

Scalability and speed. By leveraging NoSQL databases, tokenization system 1100 can scale easily with massive amounts of data and high user loads. Often times, when bulk tokenization is needed, tokenization system 1100 can provide high-speed processing by providing batch operations in which up to 5,000 tokenization or reveal operations can take place in a single API call, significantly reducing the time to tokenize or reveal values on average.

Centralized encryption key lifecycle management (e.g., via key manager 1150).

Time to Live (TTL) capabilities that can auto-delete encrypted data and tokens after a predetermined amount of time.

Portability for all stored data and ability to import tokens from other tokenization solutions.

High availability through the cloud computing platform on which tokenization system 1100 operates.

Compliance with global industry and government data regulations (e.g., PCI DSS, HIPAA, SSAE 16 SOC 2, etc.).

Embodiments disclosed herein can provide many advantages, some examples of which are listed below:

Reducing scope of PCI audits: Tokenizing credit card numbers to protect the data, comply with the PCI standard and minimize the number of systems in scope for audits is perhaps the most common use case for tokenization. This is because the payment card industry has traditionally been among the early adopters of new security solutions and because an enterprise usually looks for implementing solutions with lower audit costs providing return on investment (ROI). While not as common, in addition to PCI DSS, tokenization can be used for reducing compliance scope in other audits as well, including HIPAA Preparing sensitive data for analytics: Another, emerging use case is leveraging tokenization for securing sensitive data values so that they can still be used in data analytics. This can mean, for instance, using tokens in place of sensitive data values as unique identifiers, or tokenizing sensitive values contained in a data set to enable broader analytics use of the data within the organization without having to worry about regulations like GDPR. A benefit that tokenization has, as compared to, for instance, permanently redacting the sensitive data from the data set, is that authorized users can still return the original value, should that ever be needed for validation or other purposes.

Secure temporary caching of sensitive values: Card Verification Value (CVV) codes are a good example of a type of data that can only be stored for the absolute minimum amount of time needed to complete a task, after which it must be deleted for security reasons. The invention disclosed herein can help dealing with these types of data by providing the means to cache the data, to integrate with related systems (e.g., a credit card processing system) to perform the required processing, and then automatically purge the data according to predefined rules.

Tokenization as part of integration workflow: The invention disclosed herein can be a feature of integration services provided by a cloud computing platform. Further, the invention disclosed herein can help with applications hosted on a computer in an enterprise customer's own data center(s). If the enterprise customer has integration flows that contain sensitive data values, such values can be tokenized as part of an integration workflow, thereby removing the need for multiple platforms and products to handle these scenarios securely and compliantly.

Consolidating existing tokenization solutions: Finally, due to the portability of the tokens, the invention disclosed herein can be particularly useful for consolidating several tokenization solutions under one service to not only improve efficiency but also provide a unified view that helps with analytics. A good example of when this might be relevant is a merger and acquisition situation where a retailer buys another retailer. Both retailers may have their own tokenization solutions and customer purchase histories, but not a common view into such disparate tokenization solutions customer purchase histories. If these retailers have shared customers, the same customer's credit card number can have two different tokens (one in each system) and any analysis combining the two will likely produce a great deal of overlap. In these kinds of situations, the existing tokens can be imported to a tokenization system disclosed herein, which can either consolidate the two tokens into one, or generate a separate reference token (e.g., a "marketing token") that will link the original tokens that match the same original credit card number with each other. This helps not only to analyze future behavior, but also retain each purchase history, which is typically lost when starting from scratch with a new tokenization solution.

Figure 12:
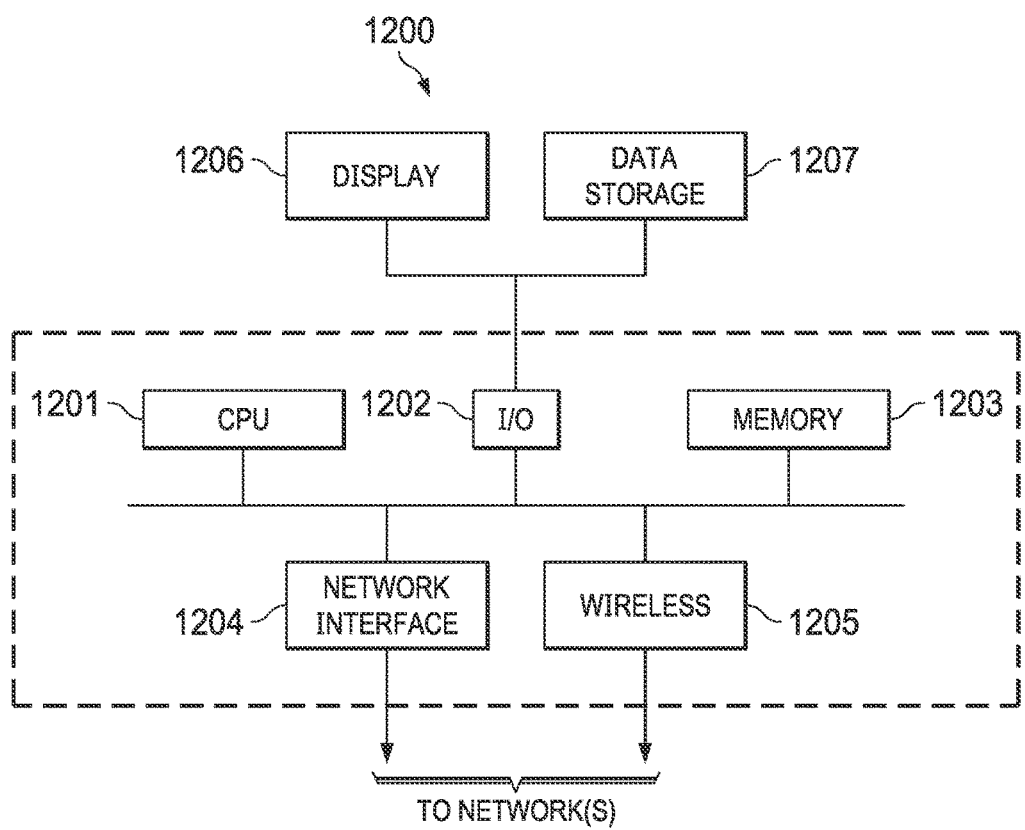
FIG. 12 depicts a diagrammatic representation of a data processing system for implementing an embodiment disclosed herein.

FIG. 12 depicts a diagrammatic representation of a data processing system for implementing an embodiment disclosed herein. As shown in FIG. 12, data processing system 1200 may include one or more central processing units (CPU) or processors 1201 coupled to one or more user input/output (I/O) devices 1202 and memory devices 1203. Examples of I/O devices 1202 may include, but are not limited to, keyboards, displays, monitors, touch screens, printers, electronic pointing devices such as mice, trackballs, styluses, touch pads, or the like. Examples of memory devices 1203 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1200 can be coupled to display 1206, information device 1207 and various peripheral devices (not shown), such as printers, plotters, speakers, etc. through I/O devices 1202. Data processing system 1200 may also be coupled to external computers or other devices through network interface 1204, wireless transceiver 1205, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of non-transitory data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a non-transitory computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human-readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for securing data, the method comprising:
receiving, by a tokenization system from a first client computing system, a request for tokenizing a document with a first portion having structured content and a second portion having unstructured or semi-structured content;

identifying, by the tokenization system, sensitive information in the first portion of the document;

generating, by the tokenization system, format-preserving tokens for the sensitive information in the first portion of the document;

identifying, by the tokenization system, the sensitive information in the second portion of the document;

generating, by the tokenization system, self-describing tokens for the sensitive information in the second portion of the document, the self-describing tokens referencing the sensitive information in the first portion of the document such that the sensitive information in the first portion of the document is secured utilizing the format-preserving tokens and the sensitive information in the second portion of the document is secured utilizing the self-describing tokens; and communicating, by the tokenization system, the format-preserving tokens and the self-describing tokens to the first client computing system or to a second client computing system.

2. The method according to claim 1, wherein a format-preserving token has a one-to-one connection to the sensitive information in the structured content.

3. The method according to claim 1, wherein a self-describing token contains a protection strategy that specifies a technique for generating or formatting a surrogate for an actual value and for mapping between the surrogate and the actual value.

4. The method according to claim 1, wherein each of the self-describing tokens has a preconfigured pattern and a token value.

5. The method according to claim 1, wherein each of the self-describing tokens has a preconfigured pattern, an indication of a protection strategy, and a token value.

6. The method according to claim 1, further comprising: marking a self-describing token in the second portion of the document with at least one visual marker in a human-readable form.

7. The method according to claim 1, wherein the first portion of the document comprises a data structure having data fields and wherein the second portion of the document comprises freeform text in one of the data fields.

8. A tokenization system for securing data, the tokenization system comprising:
a processor;
a non-transitory computer-readable medium; and
stored instructions translatable by the processor for:
receiving, from a first client computing system, a request for tokenizing a document with a first portion having structured content and a second portion having unstructured or semi-structured content;
identifying sensitive information in the first portion of the document;
generating format-preserving tokens for the sensitive information in the first portion of the document;
identifying the sensitive information in the second portion of the document;
generating self-describing tokens for the sensitive information in the second portion of the document, the self-describing tokens referencing the sensitive information in the first portion of the document such that the sensitive information in the first portion of the document is secured utilizing the format-preserving tokens and the sensitive information in the second portion of the document is secured utilizing the self-describing tokens; and
communicating the format-preserving tokens and the self-describing tokens to the first client computing system or to a second client computing system.

9. The tokenization system of claim 8, wherein a format-preserving token has a one-to-one connection to the sensitive information in the structured content.

10. The tokenization system of claim 8, wherein a self-describing token contains a protection strategy that specifies a technique for generating or formatting a surrogate for an actual value and for mapping between the surrogate and the actual value.

11. The tokenization system of claim 8, wherein each of the self-describing tokens has a preconfigured pattern and a token value.

12. The tokenization system of claim 8, wherein each of the self-describing tokens has a preconfigured pattern, an indication of a protection strategy, and a token value.

13. The tokenization system of claim 8, wherein the stored instructions are further translatable by the processor for:
marking a self-describing token in the second portion of the document with at least one visual marker in a human-readable form.

14. The tokenization system of claim 8, wherein the first portion of the document comprises a data structure having data fields and wherein the second portion of the document comprises freeform text in one of the data fields.

15. A computer program product for tokenization, the computer program product comprising a non-transitory computer-readable medium storing instructions translatable by a processor of a tokenization system for:
receiving, from a first client computing system, a request for tokenizing a document with a first portion having structured content and a second portion having unstructured or semi-structured content;
identifying sensitive information in the first portion of the document;
generating format-preserving tokens for the sensitive information in the first portion of the document;
identifying the sensitive information in the second portion of the document;
generating self-describing tokens for the sensitive information in the second portion of the document, the self-describing tokens referencing the sensitive information in the first portion of the document such that the sensitive information in the first portion of the document is secured utilizing the format-preserving tokens and the sensitive information in the second portion of the document is secured utilizing the self-describing tokens; and
communicating the format-preserving tokens and the self-describing tokens to the first client computing system or to a second client computing system.

16. The computer program product of claim 15, wherein a format-preserving token has a one-to-one connection to the sensitive information in the structured content.

17. The computer program product of claim 15, wherein a self-describing token contains a protection strategy that specifies a technique for generating or formatting a surrogate for an actual value and for mapping between the surrogate and the actual value.

18. The computer program product of claim 15, wherein each of the self-describing tokens has a preconfigured pattern and a token value.

19. The computer program product of claim 15, wherein each of the self-describing tokens has a preconfigured pattern, an indication of a protection strategy, and a token value.

20. The computer program product of claim 15, wherein the first portion of the document comprises a data structure having data fields and wherein the second portion of the document comprises freeform text in one of the data fields.

* * * * *